US007840723B1

(12) United States Patent
Kemkar

(10) Patent No.: US 7,840,723 B1
(45) Date of Patent: *Nov. 23, 2010

(54) SYSTEM AND METHOD FOR MAINTAINING AND ACCESSING INFORMATION REGARDING VIRTUAL STORAGE DEVICES

(75) Inventor: Ankur Kemkar, Cupertino, CA (US)

(73) Assignee: Symantec Operating Corporation, Mountain View, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 11/068,175

(22) Filed: Feb. 28, 2005

Related U.S. Application Data

(63) Continuation of application No. 10/324,786, filed on Dec. 20, 2002, now Pat. No. 6,883,083.

(51) Int. Cl.
*G06F 3/00* (2006.01)
(52) U.S. Cl. .......... 710/36; 370/229; 370/254; 709/217; 709/220; 709/223; 709/225; 709/238; 710/52; 710/62; 710/65; 710/107
(58) Field of Classification Search .......... 370/229, 370/254; 709/217, 220, 223, 225, 226, 238; 710/36, 52, 62, 65, 107, 11
See application file for complete search history.

(56) References Cited

U.S. PATENT DOCUMENTS

| 6,209,023 | B1 | 3/2001 | Dimitroff et al. | 709/211 |
|---|---|---|---|---|
| 6,421,711 | B1 * | 7/2002 | Blumenau et al. | 709/213 |
| 6,571,354 | B1 | 5/2003 | Parks et al. | 714/7 |
| 6,622,220 | B2 * | 9/2003 | Yoshida et al. | 711/152 |
| 6,748,502 | B2 * | 6/2004 | Watanabe et al. | 711/158 |
| 6,985,956 | B2 * | 1/2006 | Luke et al. | 709/229 |
| 2003/0093439 | A1 * | 5/2003 | Mogi et al. | 707/200 |
| 2003/0110157 | A1 * | 6/2003 | Maki et al. | 707/1 |
| 2003/0154281 | A1 | 8/2003 | Mitsuoka et al. | 709/225 |
| 2003/0200390 | A1 * | 10/2003 | Moore et al. | 711/114 |
| 2003/0221063 | A1 | 11/2003 | Eguchi et al. | 711/114 |

* cited by examiner

*Primary Examiner*—Tariq Hafiz
*Assistant Examiner*—Jasjit S Vidwan
(74) *Attorney, Agent, or Firm*—Campbell Stephenson LLP

(57) ABSTRACT

Systems, methods, apparatus and software can make use of standard input/output (I/O) interface commands to make information about virtual storage devices available to clients of those virtual storage devices. Where the storage virtualization is carried out using a switch, router, or other storage network appliance, the information about virtual devices is stored (and in many cases determined and/or processed) local to the device. Applications operating on the storage clients can conveniently access the information using I/O interface commands and need not have access to some or all of the software or functionality that virtualizes the storage.

21 Claims, 5 Drawing Sheets

FIG. 2A  FIG. 2B

SYSTEM AND METHOD FOR MAINTAINING AND ACCESSING INFORMATION REGARDING VIRTUAL STORAGE DEVICES

This application is a continuation of U.S. patent application Ser. No. 10/324,786, entitled "System and Method for Maintaining and Accessing Information Regarding Virtual Storage Devices," filed Dec. 20, 2002 now U.S. Pat. No. 6,883,083, and naming Ankur Kemkar as inventor. This application is assigned to Veritas Operating Corporation, the assignee of the present invention, and is hereby incorporated by reference, in its entirety.

FIELD OF THE INVENTION

The present invention relates to the field of fault tolerance in distributed computer systems and, more particularly, to preventing data corruption on a shared resource.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. Such distributed computing systems typically utilize one or more storage devices in support of the computing systems operations. These storage devices can be quite numerous and/or heterogeneous. In an effort to aggregate such storage devices and to make such storage devices more manageable and flexible, storage virtualization techniques are often used. Storage virtualization techniques establish relationships between physical storage devices, e.g. disk drives, tape drives, optical drives, etc., and virtual or logical storage devices such as volumes, virtual disks, and virtual logical units (sometimes referred to as virtual LUNs). In so doing, virtualization techniques provide system-wide features, e.g., naming, sizing, and management, better suited to the entire computing system than those features dictated by the physical characteristics of storage devices. Additionally, virtualization techniques enable and/or enhance certain computing system operations such as clustering and data backup and restore.

FIG. 1 illustrates a simplified example of a computing system 100. The members of the computing system 100 include host 130 and host 140. As members of computing system 100, hosts 130 and 140, typically some type of application, data, or file server, are often referred to "nodes." Hosts 130 and 140 can be designed to operate completely independently of each other, or may interoperate to form some manner of cluster. Thus, hosts 130 and 140 are typically individual computer systems having some or all of the software and hardware components well known to those having skill in the art. FIG. 5 (described below) illustrates some of the features common to such computer systems. In support of various applications and operations, hosts 130 and 140 can exchange data over, for example, network 120, typically a local area network (LAN), e.g., an enterprise-wide intranet, or a wide area network (WAN) such as the Internet. Additionally, network 120 provides a communication path for various client computer systems 110 to communicate with hosts 130 and 140. In addition to network 120, hosts 130 and 140 can communicate with each other over a private network (not shown).

Other elements of computing system 100 include storage area network (SAN) 150, SAN switch 160, and storage devices such as tape library 170 (typically including one or more tape drives), a group of disk drives 180 (i.e., "just a bunch of disks" or "JBOD"), and intelligent storage array 190. As shown in FIG. 1, both hosts 130 and 140 are coupled to SAN 150. SAN 150 is conventionally a high-speed network that allows the establishment of direct connections between storage devices 170, 180, and 190 and hosts 130 and 140. Thus, SAN 150 is shared between the hosts and allows for the sharing of storage devices between the hosts to provide greater availability and reliability of storage.

Although hosts 130 and 140 are shown connected to storage devices 170, 180, and 190 through SAN switch 160 and SAN 150, this need not be the case. Shared resources can be directly connected to some or all of the hosts in the computing system, and computing system 100 need not include a SAN. Alternatively, hosts 130 and 140 can be connected to multiple SANs. Additionally, SAN switch 160 can be replaced with a SAN router, a SAN hub, or some type of storage appliance.

Storage virtualization can general be implemented at the host level, e.g., hosts 130 and 140, at the storage device level, e.g., intelligent disk array 190, and/or at the appliance level, e.g., SAN switch 160. Host-based storage virtualization is perhaps the most common virtualization solution and is typically either packaged with the host's operating system or made available as an add-on product. Host-based virtualization allows administrators to access advanced storage management functions such as mirroring, RAID sets, redundant pathing, and hot backups (by using mirror splits or snapshots). However, it typically adds some additional overhead to the host system and the management of the virtualization is typically performed on a host-by-host basis, making global storage management difficult.

An alternative to host-based virtualization is storage-based virtualization. Storage-based virtualization solutions typically implement intelligent storage devices such as intelligent disk arrays that implement virtualization functions. For example, such devices can allow for movement between different RAID groups without data loss, as well as automatic migration of data from one RAID group to another based upon the frequency of data access. In addition, these products typically permit the creation of multiple data mirrors, which provide additional availability when one of the minors is split for hot backups. Storage-based virtualization can also be advantageous in providing the flexibility to modify LUN size, the ability to have multiple hosts see the same LUNs (which is particularly critical with high availability clustering), and remote replication. However, the more heterogeneous the storage devices, the more likely it is that there are multiple virtualization schemes with which a host-level or client-computer-system level application or user will have to contend.

Still another alternative is appliance-based virtualization. Appliance-based virtualization provides users with virtualization between the hosts and the storage, allowing for the same level of control and centralization across the storage architecture. There are, in general two kinds of appliance-based virtualization products: in-band and out-of-band. An in-band virtualization appliance is physically located between the host and the storage. The appliance takes the disk requests from the host and fulfills the host's request from the storage attached to the other side of the appliance. This functionality is essentially transparent to the host because the appliance presents itself as disk. The physical location of the appliance is the primary difference between out-of-band and in-band appliances. Out-of-band appliances logically present themselves as if they are located between the host and storage, but they actually reside to the side. This is accomplished with the installation of a driver under the host's disk driver. The appliance driver then receives logical to physical block mappings from the appliance.

In providing a common virtualization scheme for all storage devices, appliance-based virtualization does simplify the presentation and use of virtual storage devices by client computer systems. However, certain information about the virtual devices may only be available at the appliance-level and thus inaccessible by client computer systems. FIGS. 2A-2C illustrates one problem associated with such a system. FIGS. 2A-2C schematically illustrate the creation of a point-in-time copy or snapshot of an existing virtual storage device. Point-in-time copies are typically used for performing system backup, upgrade and other maintenance tasks while providing continuous availability of the original volume data. Moreover, processing of point-in-time copies can be offloaded onto another host to avoid contention for system resources on a production server.

As shown in FIG. 2A, volume 210 corresponds to one or more portions of one or more physical disks 200. In order to simply the volume's exposure to storage clients such as hosts 130 and 140 and client computer systems 110, one or more virtual disks 220 are established corresponding to volume 210. Virtual disk 220 appears to a storage client much in the same way a physical disk would. For example, a storage client can send and receive I/O commands to/from virtual disk 220 as if it is a physical disk.

In FIG. 2B, the first step in creating a snapshot volume is illustrated. Snapshot mirror 230 is a copy of the data in volume 210. When initially created, snapshot mirror 230 is typically stored on the same physical disk or disks containing volume 210. FIG. 2C illustrates the final step in which snapshot mirror 230 is organized into a separate snapshot volume 250. As part of this process, the data contained in snapshot mirror 230 is typically moved to one or more physical disks 240 that are different from those corresponding to volume 210. Additionally, one or more virtual disks 260 corresponding to snapshot volume 250 are established.

Since a storage client generally treats virtual disks 220 and 260 in a similar manner, the storage client typically does not have any information about relationships among the virtual disks. Such information, e.g., that virtual disk 260 represents a snapshot of volume 210 is only available to the software and/or hardware entity, e.g., the storage appliance, that created the relationship. Accordingly, it is desirable to have an efficient and convenient mechanism for storage clients to obtain storage virtualization information.

SUMMARY OF THE INVENTION

It has been discovered that systems, methods, apparatus and software can make use of standard input/output (I/O) interface commands to make information about virtual storage devices available to clients of those virtual storage devices. Where the storage virtualization is carried out using a switch, router, or other storage network appliance, the information about virtual devices is stored (and in many cases determined and/or processed) local to the device. Applications operating on the storage clients can conveniently access the information using I/O interface commands and need not have access to some or all of the software or functionality that virtualizes the storage.

Accordingly, one aspect of the present invention provides a method. Information about at least one virtual storage device is determined. The information about the at least one virtual storage device is stored in a form accessible via at least one input/output (I/O) interface command.

In another aspect of the present invention, a system includes a memory and an input/output (I/O) processor coupled to the memory. The I/O processor coupled to the memory is operable to process at least one input/output (I/O) interface command. The I/O processor coupled to the memory is also operable store information about at least one virtual storage device in the memory. The information about at least one virtual storage device is accessible via the at least one I/O interface command.

Yet another aspect of the present invention provides an apparatus including a means for receiving at least one input/output (I/O) interface command; a means for processing the at least one I/O interface command; and a means for storing information about at least one virtual storage device, wherein the information about at least one virtual storage device is accessible via the at least one I/O interface command.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

FIGS. 2A-2C is a simplified block diagram illustrating the formation of a snapshot volume.

DETAILED DESCRIPTION

The following sets forth a detailed description of at least the best contemplated mode for carrying out the one or more devices and/or processes described herein. The description is intended to be illustrative and should not be taken to be limiting.

The systems, methods, apparatus and software of the present invention make use of I/O interface commands. In particular, this description will focus on the use of small computer system interface version 3 (SCSI-3) INQUIRY and MODE SENSE commands. However, systems, methods, apparatus and software of the present invention need not be limited to SCSI-3 commands. Any device command structure providing similar functionality can be used, and SCSI-3 INQUIRY and MODE SENSE commands are only one example. SCSI-3 defines both the physical interconnections between compliant devices and the commands which can pass among them. Devices which comply with the SCSI-3 standard can include: direct access devices, sequential access devices, printer devices, processor devices, write once read multiple devices, magnetic storage devices, compact disk (CD) devices, scanner devices, optical memory devices, media changer devices, communication devices, storage array devices, enclosure services devices, router devices, storage appliances, and simplified direct-access devices. The aforementioned devices are all examples of shared resources and shared data resources. SCSI-3 commands are described in *SCSI Primary Commands*-3 (*SPC*-3), Working Draft, Revision 03, T10, a Technical Committee of the Accredited Standards Committee of the National Committee for Information Technology Standards (NCITS), 10 Jan. 2002, which is hereby incorporated by reference herein in its entirety. SCSI-3 INQUIRY and MODE SENSE commands are summarized at the end of this detailed description.

Figure 1:
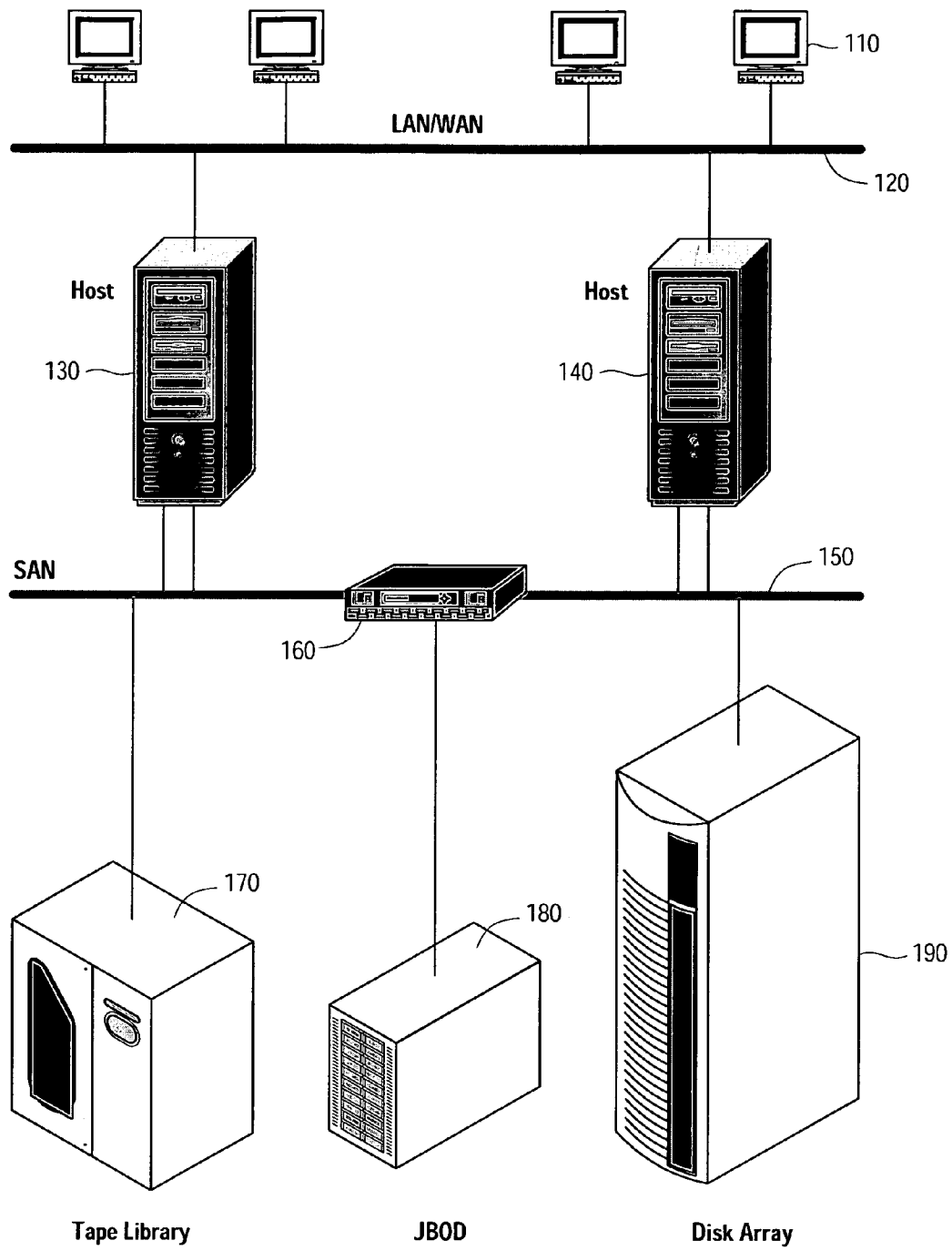
FIG. 1 is a simplified block diagram of a computing system.
Figure 2C:
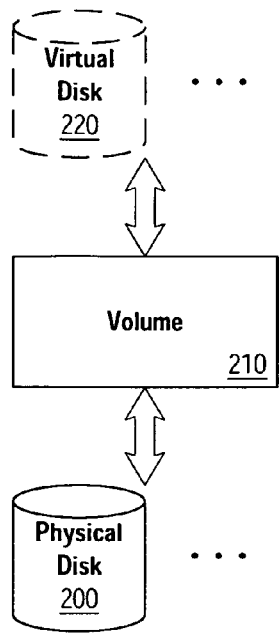
Figure 2C:
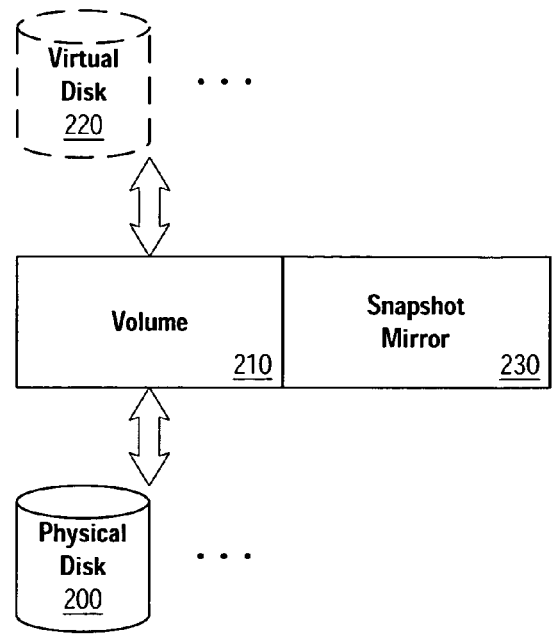
Figure 2C:
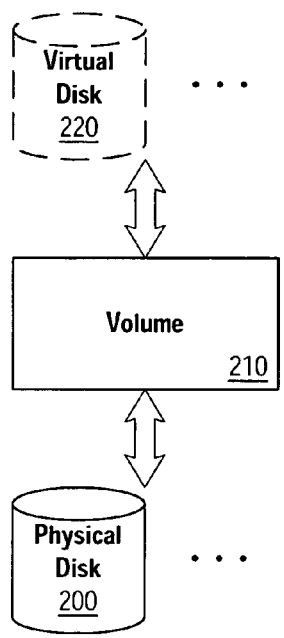
Figure 2C:
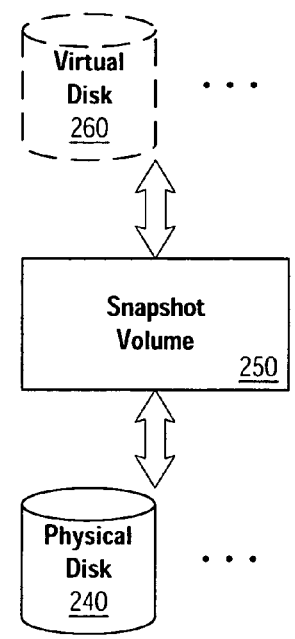
Figure 3:
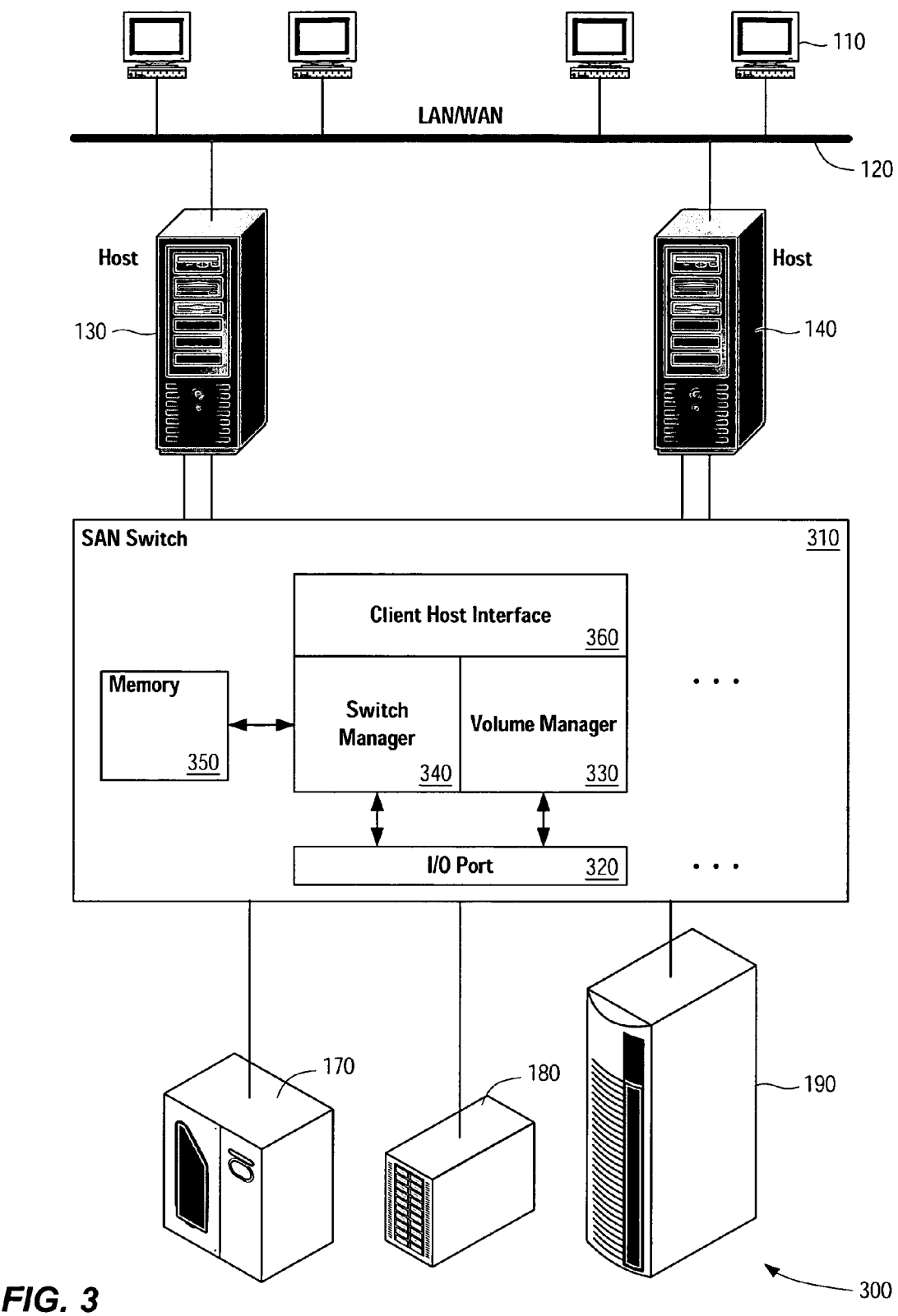
FIG. 3 is a simplified block diagram of computing system including a SAN switch utilizing some of the systems and methods of the present invention.

FIG. 3 illustrates a simplified block diagram of computing system 300 utilizing some of the systems and methods of the present invention. In the example of FIG. 3, computing system 300 includes two hosts 130 and 140. Both hosts 130 and 140 execute one or more application programs respectively. Such applications can include, but are not limited to, database administration systems (DBMS), file servers, application servers, web servers, backup and restore software, customer relationship management software, and the like. The applications and other software not shown, e.g., operating systems, file systems, and applications executing on client computer systems 110 can initiate or request I/O operations against storage devices such as tape library 170, JBOD 180, and storage array 190. These I/O operations typically include read and write operations to logical or virtual devices such as volumes, virtual LUNs, and/or virtual disks designed to appear and operate as SCSI LUNs.

SAN switch 310 is an example of a storage appliance that can implement the systems and methods of the present invention. Other devices that can be utilized include a variety of devices such as general network switches, switch-routers, routers, router-switches and other storage network devices. The term "switch" is used in this specification to describe equipment used to direct information over a network based on address information. Those skilled in the art will understand that such equipment includes, for example, switches and routers. SAN switch 310 is responsible for creating and managing the virtualization of storage devices 170, 180, and 190. In one example, SAN switch 310 presents the virtual disks to host 130, host 140, and client computer systems 110.

In support of the virtualization scheme, SAN switch 310 includes volume manager 330, switch manager 340, client host interface 360, memory 350, and I/O port 320. Although only one I/O port is illustrated, SAN switch 310 typically includes multiple I/O ports, e.g., at least one port for each device attached to the switch. Moreover, the elements shown are merely illustrative, and those having ordinary skill in the are will recognize a variety of other architectures that can be used. For example, each port can have one or more associated processors for executing software performing volume manager 330, switch manager 340, and client host interface 360 functionality. Data can be transmitted among ports using a switching fabric (not shown) implementing a crossbar, single-bus, multiple-bus, or shared-memory architecture. Additionally, volume manager 330, switch manager 340, and client host interface 360 are each typically implemented as software, microcode, or some combination of the two executing on a general-purpose microprocessor, general-purpose microcontroller, ASIC, PLD, FPGA, or the like. In this manner, the hardware and/or software operates as an I/O processor. In some embodiments, the functionality of two or more of volume manager 330, switch manager 340, and client host interface 360 is implemented in the same software and/or hardware. For example, volume manager 330 and switch manager 340 might be combined into a single software package. Additionally, there can be more than one instantiation of each of volume manager 330, switch manager 340, and client host interface 360 in some implementations.

Volume manager 330 enables physical resources configured in the computing system to be managed as logical devices. An example of software that performs some or all of the functions of volume manager 330 is the VERITAS Volume Manager™ product provided by VERITAS Software Corporation. While volume manager 330 organizes storage devices 170, 180, and 190 into one or more volumes, switch manager 340 is responsible for presenting one or more volumes as one or more virtual disks. In on example, there is a one-to-one correspondence between volumes and virtual disks.

Switch manager 340 maintains SAN switch 310 data objects such as access control lists, quality of service information, virtual disk information and route information. Some or all of the information maintained by switch manager 340 can be stored in memory 350, which can be a disk drive, a random access memory, a flash memory, or some other suitable storage medium. A virtual disk is created by defining its SCSI characteristics and its mapping to a volume established by volume manager 330. SCSI characteristics can include block size, device size, inquiry data, and mode pages. The virtual disk is a computing system wide entity in that its definition does not bind it to any specific appliance node. A route to the device can also be created. In general, a route binds a virtual disk to a specific LUN on a specific port. Switch manager 340 receives and processes one or more I/O interface commands, in this case SCSI commands, as part of its virtual disk maintaining functionality.

Switch manager 340 can utilize volume information from volume manager 330 and store it along with the information it maintains in memory 350. For example, since volume manager 330 is typically responsible for creating and maintaining snapshot volumes, it can provide information about a snapshot volume to switch manager 340. Switch manager 340 in turn stores the information in a way that is accessible using one or more I/O interface commands. For example, switch manager 340 includes the virtual device information from volume manager 330 in inquiry data that is accessible using the SCSI-3 INQUIRY command. In this way, additional information about the virtual disks and their related volumes is made accessible to hosts 130 and 140 as well as client computer systems 110. For example, an application operating on host 130, e.g., a backup and restoration application, can query SAN switch 310 using a SCSI-3 INQUIRY to gather information about the relationship among virtual disks and/or corresponding volumes.

In a particular implementation, the information about the virtual storage devices is specific to snapshot volumes. Table 1 illustrates an example of the information accessible using the SCSI-3 INQUIRY command.

TABLE 1

| Byte | Bit 7 | 6 | 5 | 4 | 3 | 2 | 1 | 0 |
|---|---|---|---|---|---|---|---|---|
| 0 | — | — | — | — | enbl | rstr | cmpl | type |
| 1-17 | volume id | | | | | | | |
| 18-25 | timestamp | | | | | | | |
| 26-41 | parent volume id | | | | | | | |

The information in Table 1 can be stored in data fields assigned for use by INQUIRY commands as described below. Additionally, the data described in Table 1, and its respective sizes and labels, is merely illustrative of the type of data that can be stored. Additional (or less) information can be included. The type bit indicates whether the volume, and thus the virtual disk in situations where there is a one-to-one correspondence between volumes and virtual disks, is a snapshot or an original (parent) volume. If the volume is a snapshot, enbl, rstr, and cmpl can provide additional information about the status of the snapshot volume. For example, cmpl indicates whether the snapshot volume is complete, rstr indicates whether the snapshot volume is be used or synchronized with its parent volume, and enbl indicates whether the snapshot volume is ready to serve snapshot data. The volume id fields provide a unique identifier for the volume to which the data corresponds. The timestamp fields provides provide time of creation information, particularly useful if the volume is a snapshot volume. The parent volume id fields provide an identifier for the parent volume, i.e., the volume from which the volume described by volume id is a snapshot.

Thus, a storage client issuing an appropriate INQUIRY command to SAN switch 310 will receive storage virtualization information back from the switch. Although described in terms of SCSI-3 INQUIRY command usage, other SCSI-3 commands, such as MODE SENSE, can be used to provide virtual device data to storage clients. Similarly, although the present discussion focuses on the SCSI-3 protocol, other protocols can be utilized. Examples of such protocols include earlier versions of the SCSI protocol, IDE, IPI, HiPPI, and the Fibre Channel Standard. Still other examples will be known to those having skill in the art.

By providing this information in a form that is accessible to hosts 130 and 140 (and also client computer systems 110) potential data loss can be avoided. Moreover, by exposing the relationships among various virtual disks, and any associated information, host applications can be better integrated on a single or set of hosts operating in the computing system. Although the examples above describe information associated with snapshot functionality, other storage virtualization information can be stored and accessed in the manner described.

Client host interface 360 provides a user interface, e.g., a command line interface or a graphical user interface, for the management of volume manager 330, switch manager 340, and/or other features of SAN switch 310. Additionally, client host interface 360 can serve as an additional interface for accessing and/or modifying information stored in memory 350, such as the aforementioned virtual device information.

Figure 4:
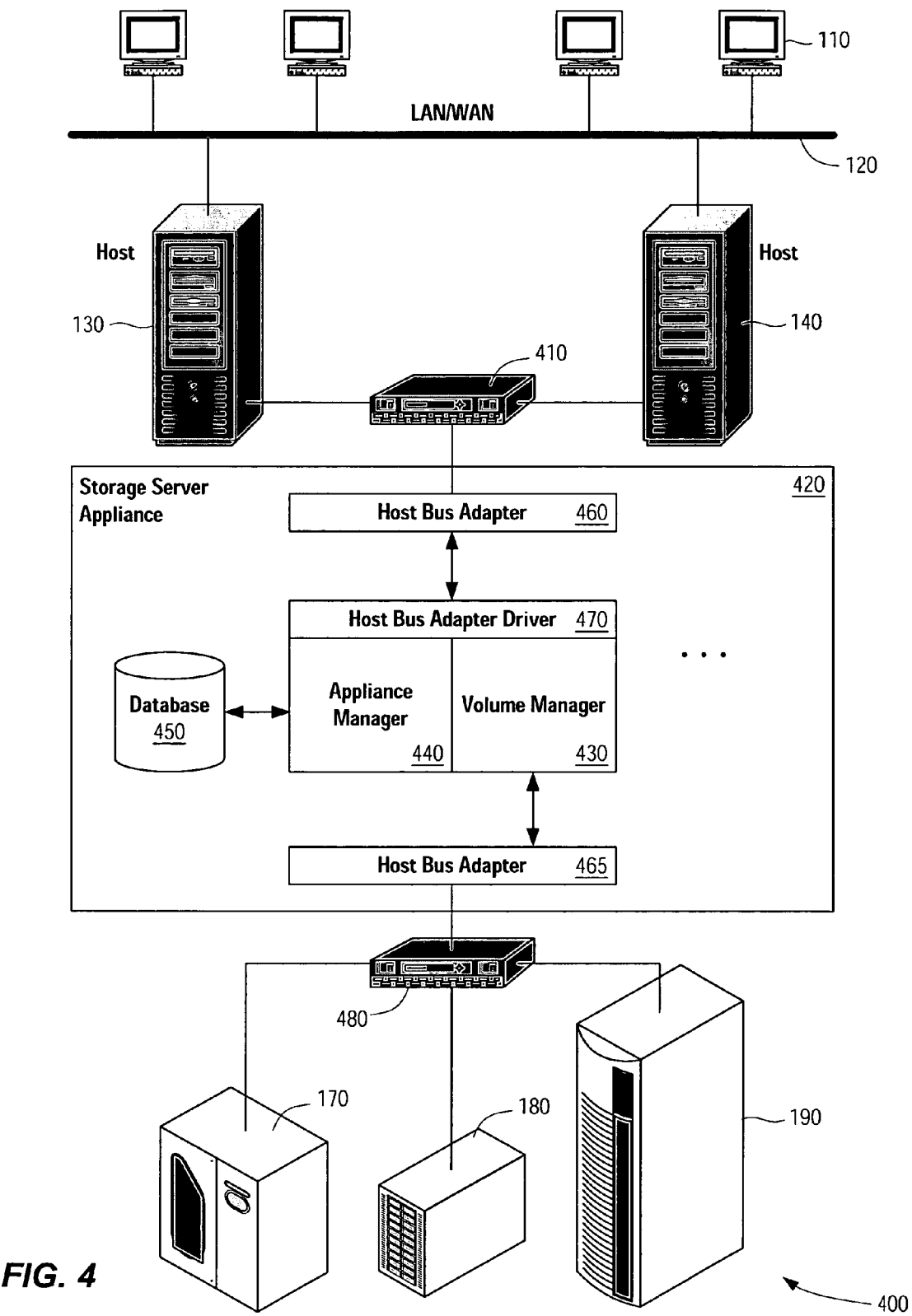
FIG. 4 is a simplified block diagram of computing system including a storage server appliance utilizing some of the systems and methods of the present invention.

FIG. 4 illustrates an alternate embodiment where storage virtualization is maintained by storage server appliance 420. In general, storage server appliance 420 differs from SAN switch 310 in that SAN switch 310 is a specialized piece of hardware, while storage server appliance 420 is typically a conventional computer system, e.g., a server, that operates additional software to provide storage server appliance functionality. An example of the type of software used to provide such functionality on conventional server hardware is the VERITAS ServPoint™ Appliance Software for SAN product provided by VERITAS Software Corporation. To enhance storage server appliance 420's integration with computing system 400, e.g., to provide additional virtualization information to applications executing on hosts 130 and 140, the systems, methods, and software of the present invention can be utilized.

Computing system 400 utilized two switches 410 and 480 to provide front side and back side storage networks. Switch 480 links all of the storage devices 170, 180, and 190 to the storage server appliance 420. Similarly, switch 410 links all of the storage clients, e.g., hosts 130 and 140 to storage server appliance 420. For added fault tolerance, multiple switches and data paths can be used as is well known to those having ordinary skill in the art.

Switch 410 is coupled to host bus adapter 460 of storage server appliance 420. Host bus adapter 460 is typically a SCSI or Fibre Channel adapter supporting a high speed/bandwidth connection. Host bus adapter driver 470 supports I/O operations from storage clients, and interface with appliance manager 440 and volume manager 430. In general, appliance manager 440 and volume manager 430 operate in much the same manner as switch manager 340 and volume manager 330. In particular, appliance manager 440 maintains data objects such as access control lists, quality of service information, virtual disk information (including the specialized information described above) and route information. Such information is stored in database 450, which is typically stored on one or more disk drives local to storage server appliance 420. In this manner, certain hardware and/or software of storage server appliance 420 operates as an I/O processor. Thus, in addition to providing functionality for managing other aspects of storage server appliance 420, appliance manager 440 receives and processes one or more I/O interface commands, in this case SCSI commands, as part of its virtual disk maintaining functionality. In an alternate embodiment, some or all of the command interpretation and response is performed by host bus adapter driver 470.

As noted above, the systems, techniques, and software of the present invention, whether used in the SAN switch context, the storage server appliance context, or some other context, allow virtual storage device clients (hosts, client computing systems, and the software operating on those systems) to have more information about the virtualization scheme even though virtualization is established and managed in a manner designed to be "transparent" to the storage client. For example, a backup software product operating on a host can make use of the information about the mapping of virtual disks to volumes and/or physical disks provided by the disclosed techniques to assist in more efficiently moving data. Thus, the virtualization information stored for access by I/O interface commands can include additional virtualization data such as the volume to physical device mapping. In general, any data associated with the storage virtualization scheme can be made available in the above described manner. Applications with access to this data can, for example, use it directly or combine the data to provide detailed mapping information about the virtualization scheme. In still another example, the techniques of the present invention can be used by data movers, or so-called third-party copy devices, to assist in data management tasks like backup and restore.

The systems and methods described above are typically implemented as one or more software programs for a computer system, that are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

Figure 5:
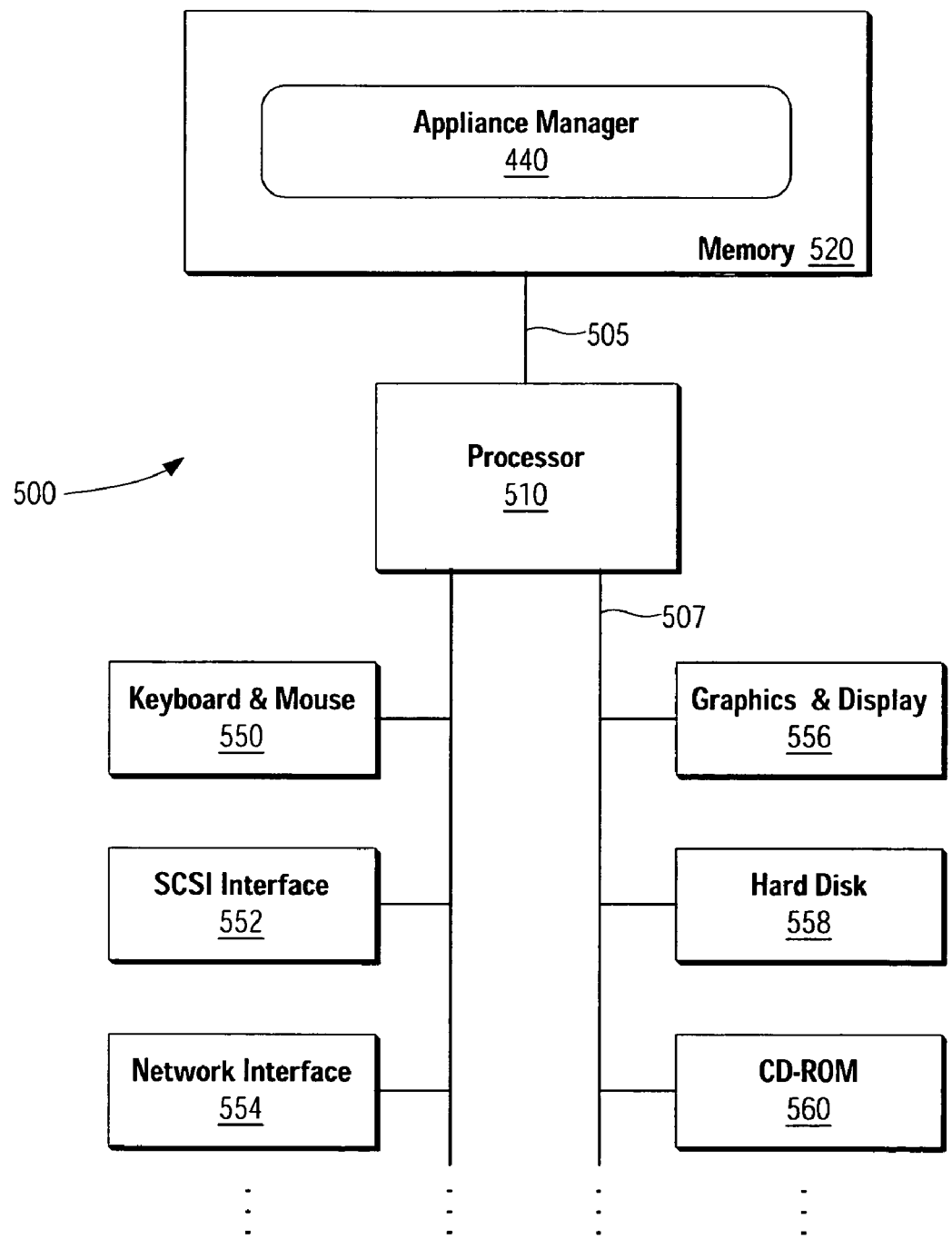
FIG. 5 is a block diagram of a computer system for implementing the techniques of the present invention.

FIG. 5 illustrates a block diagram of a computer system 500 for implementing the fencing techniques of the present invention. For example, computer system 500 can be an embodiment of one of the previously described cluster nodes. Computer system 500 includes a processor 510 and a memory 520 coupled together by communications bus 505. Processor 510 can be a single processor or a number of individual processors working together. Memory 520 is typically random access memory (RAM), or some other dynamic storage device, and is capable of storing instructions to be executed by the processor, e.g., appliance manager 440. Memory 520 is also used for storing temporary variables or other intermediate information during the execution of instructions by the processor 510.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Perl and Tcl/Tk. Additionally, software 440 can be provided to the computer system via a variety of computer readable media including electronic media (e.g., flash memory), magnetic storage media (e.g., hard disk 558, a floppy disk, etc.), optical storage media (e.g., CD-ROM 560), and communications media conveying signals encoding the instructions (e.g., via a network coupled to network interface 554).

Computer system 500 also includes devices such as keyboard & mouse 550, SCSI interface 552, network interface 554, graphics & display 556, hard disk 558, and CD-ROM 560, all of which are coupled to processor 510 by communications bus 507. It will be apparent to those having ordinary skill in the art that computer system 500 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

Summary of SCSI-3 Inquiry and Mode Sense Commands

This description of INQUIRY and MODE SENSE commands utilizes terms defined in greater detail in the aforementioned *SCSI Primary Commands*-3 (*SPC*-3), "the standard". Additionally, a more complete description of these commands can be found in the standard. The standard describes various SCSI devices, and the hardware/software entities supporting SCSI functionality using several specific terms. For example, a SCSI target device contains logical units and target ports (sometimes referred to as targets), and receives device service and task management requests for processing. A logical unit is an externally addressable entity within a target that implements a SCSI device model and contains a device server. A device server is an object within a logical unit that executes SCSI tasks according to the rules of task management.

The INQUIRY command requests that information regarding parameters of the target and a component logical unit be sent to the application client. Options allow the application client to request additional information about the target and logical unit or information about SCSI commands supported by the device server. The basic form of the command includes an operation code specific to the command, certain defined flags or bits, an additional page or operation code field, and additional fields. An enable vital product data (EVPD) bit of one specifies that the device server shall return the vital product data specified by the PAGE OR OPERATION CODE field. A command support data (CMDDT) bit of one specifies that the device server shall return the optional command support data specified by the PAGE OR OPERATION CODE field. If the device server does not support returning command data and this bit is set to one, the device server shall return CHECK CONDITION status with the sense key set to ILLEGAL REQUEST and an additional sense code of INVALID FIELD IN CDB.

If both the EVPD and CMDDT bits are zero, the device server shall return the standard INQUIRY data (described below). If the PAGE OR OPERATION CODE field is not zero when both EVPD and CMDDT are zero, the device server shall return CHECK CONDITION status with the sense key set to ILLEGAL REQUEST and an additional sense code of INVALID FIELD IN CDB. If both the EVPD and CMDDT bits are one, the device server shall return CHECK CONDITION status with the sense key set to ILLEGAL REQUEST and an additional sense code of INVALID FIELD IN CDB. When the EVPD bit is one, the PAGE OR OPERATION CODE field specifies which page of vital product data information the device server shall return. When the CMDDT bit is one, the PAGE OR OPERATION CODE field specifies the SCSI operation code for which device server shall return command support data. The INQUIRY command shall return CHECK CONDITION status only when the device server is unable to return the requested INQUIRY data.

The standard INQUIRY data contains at least 36 bytes and includes a number of defined fields, flag bits, and reserved fields. PERIPHERAL QUALIFIER and PERIPHERAL DEVICE TYPE fields identify the device currently connected to the logical unit. If the target is not capable of supporting a device on this logical unit, the device server sets this field to 7Fh (PERIPHERAL QUALIFIER set to 011b and PERIPHERAL DEVICE TYPE set to 1Fh). A removable medium (RMB) bit of zero indicates that the medium is not removable. A RMB bit of one indicates that the medium is removable. A VERSION field indicates the implemented version of the standard. An asynchronous event reporting capability (AERC) bit indicates that the target supports asynchronous event reporting capability. A hierarchical support (HISUP) bit of zero indicates the target does not use the hierarchical addressing model to assign logical unit numbers (LUNs) to logical units. A HISUP bit of one indicates the target uses the hierarchical addressing model to assign LUNs to logical units. A RESPONSE DATA FORMAT field value of two indicates that the data shall be in the format specified in the standard. An ADDITIONAL LENGTH field specifies the length in bytes of the parameters.

An SCC Supported (SCCS) bit of one indicates that the device contains an embedded storage array controller component. An SCCS bit of zero indicates that the device does not contain an embedded storage array controller component. A Third-Party Copy (3PC) bit of one indicates that the device supports third-party copy commands. A 3PC bit of zero indicates that the device does not support such commands. The contents of an asymmetric logical unit access (ALUA) field indicate the support for asymmetric logical unit access. An Enclosure Services (ENCSERV) bit of one indicates that the device contains an embedded enclosure services component. An ENCSERV bit of zero indicates that the device does not contain an embedded enclosure services component. A Multi Port (MULTIP) bit of one indicates that this is a multi-port (two or more ports) device. A value of zero indicates that this device has a single port and does not implement the multi-port requirements. A medium changer (MCHNGR) bit of one indicates that the device is associated with or attached to a medium transport element. A MCHNGR bit of zero indicates that the device is not embedded within or attached to a medium transport element. A relative addressing (RELADR) bit of one indicates that the device server supports the relative addressing mode. A RELADR bit of zero indicates the device server does not support relative addressing. A linked command (LINKED) bit of one indicates that the device server supports linked commands. A value of zero indicates the device server does not support linked commands. A command queuing (CMDQUE) bit of one indicates that the device supports tagged tasks (command queuing) for this logical unit. A value of zero indicates the device server may support tagged tasks for this logical unit.

ASCII data fields are also included for such information as VENDOR IDENTIFICATION, PRODUCT IDENTIFICATION, PRODUCT REVISION LEVEL, and vendor specified information. Additionally, VERSION DESCRIPTOR fields provide for identifying up to eight standards to which the device claims conformance.

The MODE SENSE commands provide a means for a device server to report parameters to an application client. These commands are complementary to the MODE SELECT commands. The MODE SELECT commands provide a means for an application client to specify medium, logical unit, or peripheral device parameters to the device server. The standard describes two versions of the MODE SENSE command, however this summary focuses on the MODE SENSE (6) command. The basic form of the command includes an operation code specific to the command, certain defined flags or bits, and additional fields.

A disable block descriptors (DBD) bit of zero indicates that the device server may return zero or more block descriptors in the returned MODE SENSE data. A DBD bit of one specifies that the device server shall not return any block descriptors in the returned MODE SENSE data. A page control (PC) field defines the type of mode parameter values to be returned in the mode pages. The PC field only affects the mode parameters within the mode pages. A PAGE CODE field specifies which mode page(s) to return. An application client may request any one or all of the supported mode pages from the device server. Mode pages and block descriptors are used in conjunction with the MODE SELECT and MODE SENSE commands to store information about the target device. Typically, mode pages exist that are specific to each device type, and the information is saved by the target in a nonvolatile, vendor specific location. If an application client issues a MODE SENSE command with a page code value not implemented by the target, the device server shall return CHECK CONDITION status and shall set the sense key to ILLEGAL REQUEST and the additional sense code to INVALID FIELD IN CDB.

What is claimed is:

1. A method comprising:
   determining information regarding a virtual storage device, wherein
      the virtual storage device is a virtual disk,
      the virtual disk corresponds to a volume,
      the volume corresponds to a storage device,
      the information is configured to describe the virtual disk by virtue of being configured to describe the volume, and
      the information is configured to describe the volume by virtue of being configured to
         identify the volume as one of
            a parent volume, and
            a copy of the parent volume, and
         identify the parent volume, if the information identifies the volume as the copy of the parent volume; and
   storing the information at a storage network device, wherein
      the storage network device is configured to be logically coupled between a computer system and the storage device,
      the storage network device is configured to organize the storage device into the volume,
      the storage network device is configured to store the information at the storage network device in a form accessible by the computer system,
      the storage network device is configured to provide the computer system access to the information, in response to an input/output (I/O) interface command sent from the computer system, and
      the storage network device is configured to provide the access to the information
         without providing the computer system access to the virtual storage device, and
         without providing the computer system access to the storage device.

2. The method of claim 1 wherein the I/O interface command is a command included in a standardized I/O protocol.

3. The method of claim 2 wherein the standardized I/O protocol is the small computer system interface version three (SCSI-3) protocol.

4. The method of claim 3 wherein the I/O interface command is one of a SCSI-3 INQUIRY command and a SCSI-3 MODE SENSE command.

5. The method of claim 1 further comprising:
   receiving a request for the information;
   processing the request for the information; and
   transmitting the information.

6. The method of claim 5 wherein
the request for the information is from the computer system, and
the computer system is a client of the virtual storage device.

7. The method of claim 1 wherein the information comprises at least one of:
a volume identifier;
a parent volume identifier;
a snapshot volume indicator;
a snapshot volume creation timestamp; and
a snapshot volume status indicator.

8. The method of claim 1 wherein the storing the information further comprises:
storing the information in a database.

9. The method of claim 1 encoded in a computer readable medium as instructions executable on a processor, the computer readable medium being one of an electronic storage medium, a magnetic storage medium, and an optical storage medium encoding the instructions.

10. A system comprising:
a memory; and
an input/output (I/O) processor, wherein
the I/O processor is coupled to the memory,
the I/O processor is configured to
receive an input/output (I/O) interface command,
process the I/O interface command, and
in response to processing the I/O interface command, store information, wherein
the information is information regarding a virtual storage device,
the virtual storage device comprises a virtual disk,
the virtual disk corresponds to a volume,
the volume corresponds to a storage device,
the information is configured to describe the virtual disk by virtue of being configured to describe the volume,
the information is configured to describe the volume by virtue of being configured to
identify the volume as one of
a parent volume, and
a copy of the parent volume, and
identify the parent volume, if the information identifies the volume as the copy of the parent volume,
the system is configured to be logically coupled between another system and the storage device,
the system is configured to organize the storage device into the volume,
the I/O processor is configured to store the information by virtue of being configured to store the information in the memory in a form accessible by the another system,
the I/O processor is configured to provide the another system access to the information, in response to the I/O interface command, and
the system is configured to provide the access to the information
without providing the another system access to the virtual storage device, and
without providing the computer system access to the storage device.

11. The system of claim 10 wherein the I/O interface command is a command included in a standardized I/O protocol.

12. The system of claim 11 wherein the standardized I/O protocol is the small computer system interface version three (SCSI-3) protocol.

13. The system of claim 12 wherein the I/O interface command is one of a SCSI-3 INQUIRY command and a SCSI-3 MODE SENSE command.

14. The system of claim 10 wherein the I/O processor is further operable to:
receive the I/O interface command from a computer system that is a client of the virtual storage device; and
transmit the information.

15. The system of claim 10 wherein the comprises at least one of:
a volume identifier;
a parent volume identifier;
a snapshot volume indicator;
a snapshot volume creation timestamp; and
a snapshot volume status indicator.

16. The system of claim 10 wherein the I/O processor is one of a microprocessor executing instructions encoded in a computer readable medium, an application specific integrated circuit (ASIC), a field programmable gate array (FPGA) and a programmable logic device (PLD).

17. The system of claim 10 wherein the memory is a non-volatile memory.

18. The system of claim 10 wherein the memory is at least one of a disk drive, a random access memory (RAM), and a flash memory.

19. An apparatus comprising:
a means for receiving an input/output (I/O) interface command from a computer system;
a means for processing the I/O interface command
the means for processing is coupled to the means for receiving; and
a means for storing information regarding a virtual storage device, wherein
the virtual storage device comprises a virtual disk,
the virtual disk corresponds to a volume,
the volume corresponds to a storage device,
the information is configured to describe the virtual disk by virtue of being configured to describe the volume,
the information is configured to describe the volume by virtue of being configured to
identify the volume as one of
a parent volume, and
a copy of the parent volume, and
identify the parent volume, if the information identifies the volume as the copy of the parent volume,
the means for storing is coupled to the means for processing and is configured to store the information at a storage network device in a form accessible by the computer system,
the storage network device is configured to be logically coupled between the computer system and the storage device,
the storage network device is configured to organize the storage device into the volume,
the storage network device is configured to provide the computer system access to the information, in response to the I/O interface command sent from the computer system, and
the storage network device is configured to provide the access to the information
without providing the computer system access to the virtual storage device, and
without providing the computer system access to the storage device.

20. The apparatus of claim 19 further comprising:
a means for determining the information.

21. The apparatus of claim 19 further comprising:
a means for transmitting the information.

* * * * *